March 22, 1966  A. J. W. PLOUM ETAL  3,241,933
PROCESS FOR THE REFORMING OF NATURAL GAS
Filed April 24, 1962
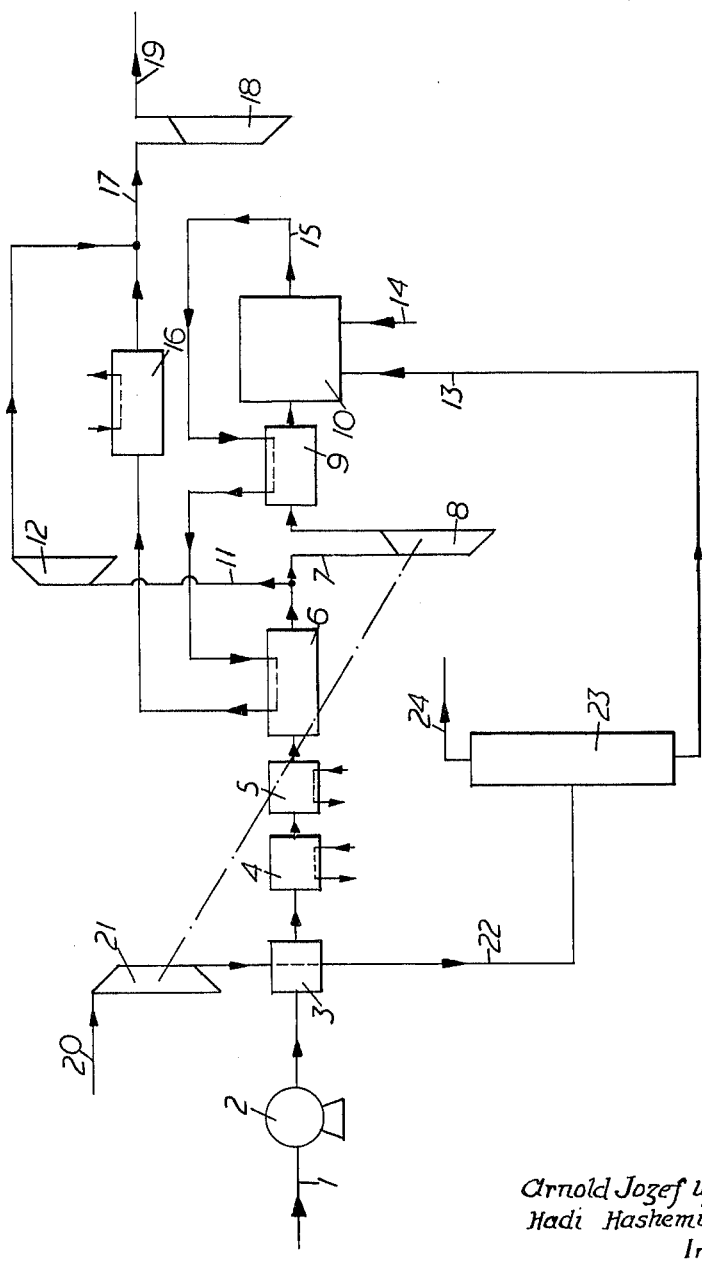
Arnold Jozef Willem Ploum
Hadi Hashemi-Tafreshi
Inventors
By McDougall
and Hersh
Attorney

United States Patent Office 3,241,933
Patented Mar. 22, 1966

3,241,933
PROCESS FOR THE REFORMING OF NATURAL GAS
Arnold Jozef Willem Ploum, L'Ile Residentielle de Villennes-sur-Seine, France, and Hadi Hashemi-Tafreshi, Norman, Okla., assignors to Conch International Methane Limited, Nassau, Bahamas, a Bahamian company
Filed Apr. 24, 1962, Ser. No. 189,833
Claims priority, application Great Britain, Aug. 17, 1961, 29,696/61
5 Claims. (Cl. 48—196)

This invention relates to a process of reforming natural gas or a similar gas mainly or entirely consisting of methane. In the specification and the claims references to natural gas include pure methane and any gas mixture, the major ingredient of which is methane.

It is known to reform natural gas by mixing it with oxygen and preferably also with water vapour and to bring the mixture to reaction to form reaction products substantially consisting of hydrogen and carbon monoxide.

The invention provides a method of reforming natural gas in which latent energy present in the feed and energy generated in the process is skillfully applied in order to improve the economy of the reforming treatment.

The invention relates to a reforming process of the kind indicated above comprising producing pressurised natural gas starting from natural gas in liquid form, heating the gas by indirect heat exchange with the reaction products of the reforming step, passing the thus heated pressurised natural gas through an expansion engine to produce energy, using the refrigeration potential of the liquid natural gas in an air rectification plant for the production of oxygen, and reforming the expanded natural gas using the oxygen thus obtained.

The refrigeration potential of the liquid natural gas may be advantageously used for cooling the pressurised air-feed of the air rectification plant. Depending, however, on the particular liquefaction cycle used in the air rectification plant, the cold of the liquid natural gas may be put, alternatively, into the oxygen and/or nitrogen produced, the feed air being cooled by other means, e.g. by cold gaseous nitrogen from the process.

In a very efficient embodiment of the present process the energy produced in the expansion step is used in the air rectification plant for the production of oxygen or—as the case may be—of nitrogen.

In a high pressure rectifier the energy may advantageously be employed for compressing the air feed; in an atmospheric pressure air rectifier however, the energy can better be used for compressing the nitrogen or oxygen or both.

After having passed the heat exchanger for the indirect heat exchange with the pressurised natural gas, the reformed gas may be blended with other gases such as non-reformed natural gas, coal gas or gas from an oil gasification process, for example to produce a gas complying with specific town gas requirements. If blending has to be carried out with natural gas, the reaction products of the reforming step may be mixed with a stream of non-reformed natural gas branched off from the main stream of natural gas after this stream has been heated in the indirect heat exchange step.

If in this case the side stream of natural gas is taken off from the main stream at a point situated before the expansion step, the side stream may be led to separate expansion engine to produce energy; the expanded side stream is then mixed with the cooled reaction products of the reforming step.

The process according to the invention will now be further described with reference to the accompanying drawing which represents a schematic flow diagram of a reforming process showing several of the features explained above.

Liquefied natural gas at its boiling point at atmospheric pressure, viz. minus 161 degrees centigrade, withdrawn from transport or storage tanks, enters the system by a conduit 1. The stream is compressed in a compressor 2 to 105 kg./cm.$^2$; its temperature will then be about minus 155 degrees centigrade. This compressed liquid natural gas is then used to cool compressed air in heat exchanger 3. In this way the latent energy present in the liquid natural gas is efficiently used for the production of oxygen (or nitrogen as the case may be) in an air rectification plant, which oxygen is to be employed in the reforming of the natural gas. The natural gas stream further passes through heat exchangers 4 and 5 where it is warmed by means of sources of cheap heat such as sea water and waste hot water. On passing heat exchangers 3, 4 or 5 the originally liquid natural gas is evaporated and warmed to about 37 degrees centigrade, the pressure of the resulting gas being still at about 105 kg./cm.$^2$.

The natural gas is then heated to about 260 degrees centigrade in heat exchanger 6, where it is led into indirect counter current heat exchange with the reaction products of the reforming step to be described hereinafter. The natural gas leaves this heat exchanger at a temperature of about 260 degrees centigrade.

Thereupon the natural gas is divided into two streams, one going through a conduit 7 to an expansion engine 8 and subsequently via a heat exchanger 9 to a reactor 10; the other stream flows through a conduit 11 to an expansion engine 12. The division of the two streams may be in the ratio of, for instance, 40% to the reactor and 60% branched off to the expansion engine 12.

In expander 8 the gas is expanded down to a pressure of 35 kg./cm.$^2$, the temperature thereby decreasing to a valve of about 170 degrees centigrade. The temperature of the gas is then raised again in heat exchanger 9 by heat exchange with reformed products of the reforming step to a value of about 300 degrees centigrade. The thus heated natural gas is thereupon fed to the reactor 10 where the reforming of the gas is carried out. The natural gas is mixed and brought to reaction with oxygen and a small amount of steam entering the reactor through conduits 13 and 14 respectively. Since the reforming of natural gas is well known in the art, it will not be described here in further detail.

The reaction products leaving the reactor via conduit 15 substantially consist of hydrogen and carbon monoxide; they have assumed a temperature of about 1093 degrees centigrade and a pressure of 28 kg./cm.$^2$.

These products pass in series through the heat exchangers 9 and 6 mentioned above in order to heat pressurized natural gas according to the invention and then through a waste heat boiler 16 where low-pressure steam is produced.

The natural gas branced off via conduit 11 is expanded in expander 12 down to a pressure of 28 kg./cm.$^2$ and a temperature of about 160 degrees centigrade. The thus expanded natural gas is blended with the reformed gas leaving heat exchanger 16. The total stream of gases is led via a conduit 17 to an expansion engine 18. The gases are expanded down to a pipe line pressure of 8 kg./cm.$^2$ and a temperature of about 37 degrees centigrade; they leave the system through a conduit 19 and may be used as town gas.

Air enters the process through a conduit 20 and is compressed by means of a compressor 21. The compressed air is brought into heat exchange with the pressurised liquid natural gas in heat exchanger 3 and then flows via a conduit 22 to an air rectification plant schematically indicated in the drawing as a distillation column 23. The air is separated in this plant into oxygen and nitrogen, which leave the plant through conduits 13 and 24 respectively. All or part of the oxygen thus produced is used in the reactor 10 for reforming natural gas.

The nitrogen produced may be used in the liquid state in a way and for reasons known per se to replace all or part of the liquid natural gas which is withdrawn from storage and/or transport tanks.

The gases expanding in expansion engines 8, 12 and 18 produce energy. The energy thus produced may advantageously be used in the reforming process. Thus for example it is possible to use the energy produced by one or more of the engines 8, 12 and 18 for driving the air compressor 21.

In the flow diagram shown in the drawing the stream of natural gas which is not to be reformed has been branched off from conduit 7 and expanded separately from the stream destined for the reforming operation. Both streams may, however, be expanded together in the same expander, the division being then effected at a point further on in the scheme, e.g. between the expander 8 and the heat exchanger 9 or between the heat exchanger 9 and the reactor 10. In this case, too, the streams meet again in the conduit 17.

It is further to be remarked that the heat exchanger 9 may be omitted altogether.

The ratio in which the natural gas stream is divided, which according to the example given was set at 40/60, may be varied; the ratio generally depends on the requirements the blended product has to fulfil. It is, however, to be kept in mind that divisions of the original stream of natural gas and subsequent blending is not a mandatory step of the process according to the invention.

We claim:

1. Process of reforming natural gas into hydrogen and carbon monoxide by reaction with oxygen comprising
   (a) pressurizing liquefied natural gas to produce pressurized liquefied natural gas,
   (b) evaporating the pressurized liquefied natural gas by passing it in heat exchange relationship with air to cool the air and to produce pressurized natural gas,
   (c) rectifying the cooled air from step (b) to produce oxygen,
   (d) heating the said pressurized natural gas by indirect heat exchange with the reaction products of a subsequent reforming step,
   (e) passing the heated and pressurized natural gas from step (d) through an expansion engine to reduce the pressure of the natural gas and to produce useful mechanical energy,
   (f) reacting natural gas from step (e) with oxygen from step (c) to produce hydrogen and carbon monoxide as reformed gas product at a high temperature, and
   (g) using the hot reformed gas produced from step (f) in the heat exchange of step (d).

2. Process as claimed in claim 1, including the step of pressurizing the air prior to step (b) of claim 1.

3. Process as claimed in claim 2, and the further step of using the mechanical energy produced in step (e) of claim 1 to pressurize the air in claim 2.

4. Process of reforming liquid natural gas into hydrogen and carbon monoxide by reaction of natural gas with oxygen comprising
   (a) converting the liquid natural gas into pressurized liquid natural gas,
   (b) evaporating the pressurized liquified natural gas by passing it in heat exchange relationship with pressurized air to cool the air and to produce pressurized natural gas,
   (c) heating said pressurized natural gas by indirect heat exchange with the reaction product of a subsequent reforming step,
   (d) passing the heated and pressurized natural gas from step (c) through an expansion engine to reduce the pressure of the natural gas and to produce useful mechanical energy,
   (e) using at least a part of said mechanical energy for the pressurization of air for use in step (b)
   (f) rectifying the cooled air from step (b) to produce oxygen,
   (g) reacting the natural gas from step (d) with water and with oxygen from step (f) to produce hydrogen and carbon monoxide as reformed gas product at a high temperature,
   (h) using the hot reformed gas produced from step (g) in the heat exchange of step (c), and
   (i) blending the reaction products of step (g) subsequent to the heat exchange of step (c) with a stream of non-reformed natural gas as the final product.

5. Process as claimed in claim 1, including the step of branching off a side stream of non-reformed natural gas from the main stream of natural gas after this stream has been heated in the indirect heat exchange step (d), expanding said side stream and then blending it with the cold reaction products of the reforming step.

References Cited by the Examiner
UNITED STATES PATENTS

| | | |
|---|---|---|
| 1,926,170 | 9/1933 | Oberfell et al. |
| 2,465,235 | 3/1949 | Kubicek. |
| 2,671,718 | 3/1954 | De Coriolis _____ 48—196 |
| 3,018,634 | 1/1962 | Gilmore _____ 62—38 X |

OTHER REFERENCES

Wittmann et al.: German printed application, 1,102,112, Mar. 16, 1961.

MORRIS O. WOLK, *Primary Examiner.*